United States Patent [19]

Saunders

[11] 4,123,002
[45] Oct. 31, 1978

[54] HEATING AND VENTILATION SYSTEM

[76] Inventor: Norman B. Saunders, 15 Ellis Rd., Weston, Mass. 02193

[21] Appl. No.: 821,416

[22] Filed: Aug. 3, 1977

Related U.S. Application Data

[60] Continuation-in-part of Ser. No. 639,305, Dec. 30, 1975, abandoned, which is a division of Ser. No. 529,235, Dec. 3, 1974, Pat. No. 3,952,947.

[51] Int. Cl.$^2$ ............................................. F24J 3/02
[52] U.S. Cl. ..................................................... 237/1 A
[58] Field of Search ............... 237/1 A, 2 B; 126/270; 62/238, 79, 260

[56] References Cited

U.S. PATENT DOCUMENTS

| | | | |
|---|---|---|---|
| 1,467,005 | 9/1923 | Lawrence | 237/1 A |
| 1,945,975 | 2/1934 | Munters | 62/59 |
| 2,677,243 | 5/1954 | Telkes | 165/48 X |
| 2,829,504 | 4/1958 | Schlichtig | 62/260 X |
| 3,732,703 | 5/1973 | Nordstrom et al. | 62/151 |

Primary Examiner—William E. Wayner
Attorney, Agent, or Firm—Schiller & Pandiscio

[57] ABSTRACT

A system is described for controlling the air and radiant temperature, ventilation, and humidity within an enclosed building. The system heats or cools air drawn through the ground and introduced into a conduit disposed below the frost line where it is drawn into the interior of the building. The air is circulated through the building where it may be either heated or cooled and then exhausted. Apparatus is provided for either recovering and storing heat from or transferring excess heat to the exhausted air. The apparatus comprises a tank for storing a first heat absorbing fluid, a compressor for compressing a second heat exchange fluid, a heat exchanger for transferring heat from air leaving the interior of the building to the second fluid when heat is to be stored (or transferring from the second fluid to air leaving the interior of the enclosure when heat is to be released from the system). The apparatus also includes a reversible heat pump and conduit means for circulating the second fluid among the tank, compressor, and heat exchanger in a direction depending on the mode of operation. The conduit means includes a coil disposed in the tank for transferring heat between the first and second fluids so that in one mode of operation it functions as a condenser when heat is stored in a tank and in a second mode as an evaporator when heat is to be released from the system.

8 Claims, 5 Drawing Figures

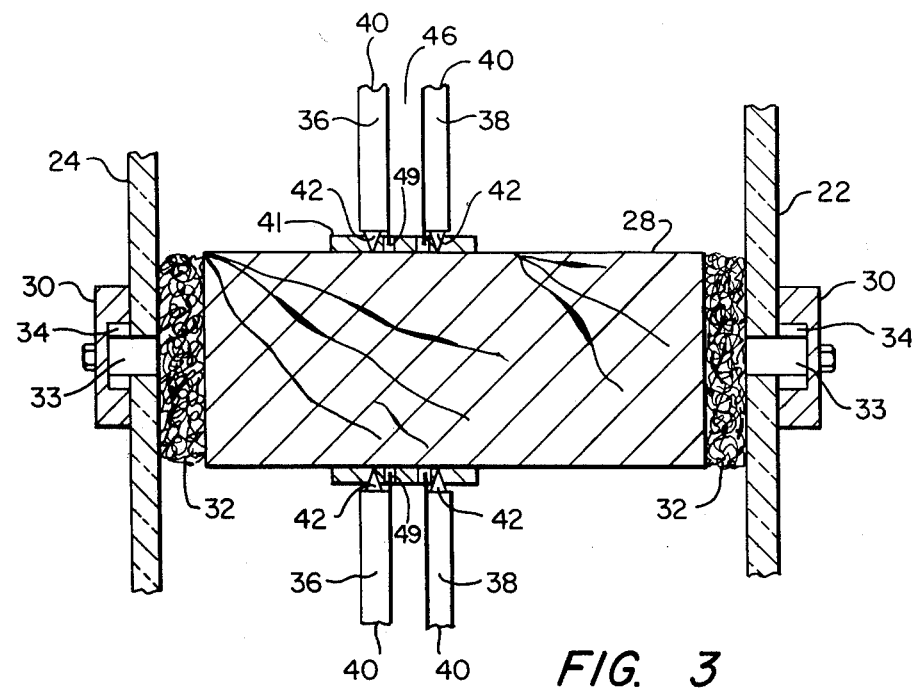
FIG. 3
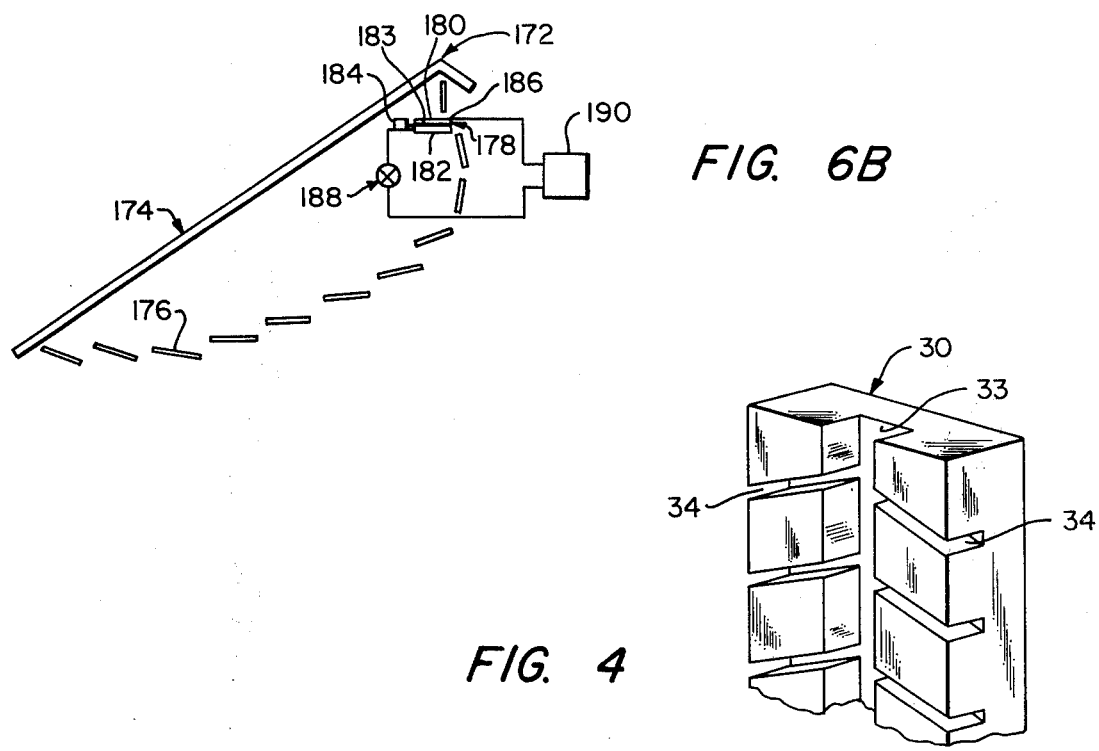
FIG. 6B
FIG. 4

HEATING AND VENTILATION SYSTEM

RELEATED APPLICATIONS

This application is a continuation-in-part of my copending application Ser. No. 639,305 filed Dec. 30, 1975, now abandoned, which in turn is a divisional application of application Ser. No. 529,235 filed Dec. 3, 1974, now U.S. Pat. No. 3,952,947 issued Apr. 27, 1976.

This invention relates to the heating and ventilation systems and more specifically, to a system for naturally controlling the temperature and humidity within an enclosed building.

With the advent of the energy crisis, serious efforts are now being made to harness solar energy or "isolation", i.e. energy received from the sun. As a result, various systems have been developed, such as specially designed glazed windows for absorbing the sun's energy, and reradiating it into the building structure. Many of these systems, however, are highly inefficient since the window itself becomes hot resulting in energy loss through the window. Another disadvantage of many of these glazed window systems is that heat is only provided so long as the sun is shining. Further, glazed windows usually form a closed system, and thus separate ventilation and humidification systems must be provided. This is psychologically displeasing to the occupants of the building, since many of these separate ventilation systems do not always provide fresh air but merely recirculate it.

Another type of system which is generally known employs water as a heat absorber and carrier. The water can absorb heat by either flowing over a directly-exposed sloping roof (which may be heat reflective); or by flowing adjacent heat collectors, the latter absorbing heat energy from the sun and transferring or reradiating energy in order to heat the water. Many of the water systems, however, suffer from some of the same disadvantages as the glazed window systems mentioned above.

A third type of system generally known, employs photovoltaic cells which generally provide electromagnetic forces when directly exposed to the sun's energy. These photovoltaic cells are relatively expensive and thus this type of system is at this time not commerically acceptable.

Accordingly, an object of the present invention is to overcome the above-noted disadvantages.

Another object of the present invention is to provide a system for drawing air through the ground for raising the relative humidity and raising or lowering the temperature of air introduced into a building.

And another objects of the present invention is to provide a system which either recovers and stores heat or extracts or releases excess heat from air exhausted from a building depending on the mode of operation.

Still another object of the present invention is to provide a system for drawing air through the ground so as to raise the relative humidity and raise or lower the temperature of the air before being introduced into a building, circulating the air through the building and extracting heat from or releasing heat to the air when exhausting it from the building.

These and other objects of the present invention are achieved by a system comprising means for drawing air through the ground exterior of a building below the frost line, through suitable conduit and into the building and circulating the air through the building, and means for either recovering and storing heat from air exhausted from the building or releasing excess heat to the air as it is exhausted from the building.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 3 shows an enlarged fragmentary horizontal cross-sectional view of the window of FIG. 2;

FIG. 4 shows a fragmentary, perspective view of a portion of the embodiment of the window of FIG. 2.

In the drawings, like numerals refer to like parts.

Figure 1:
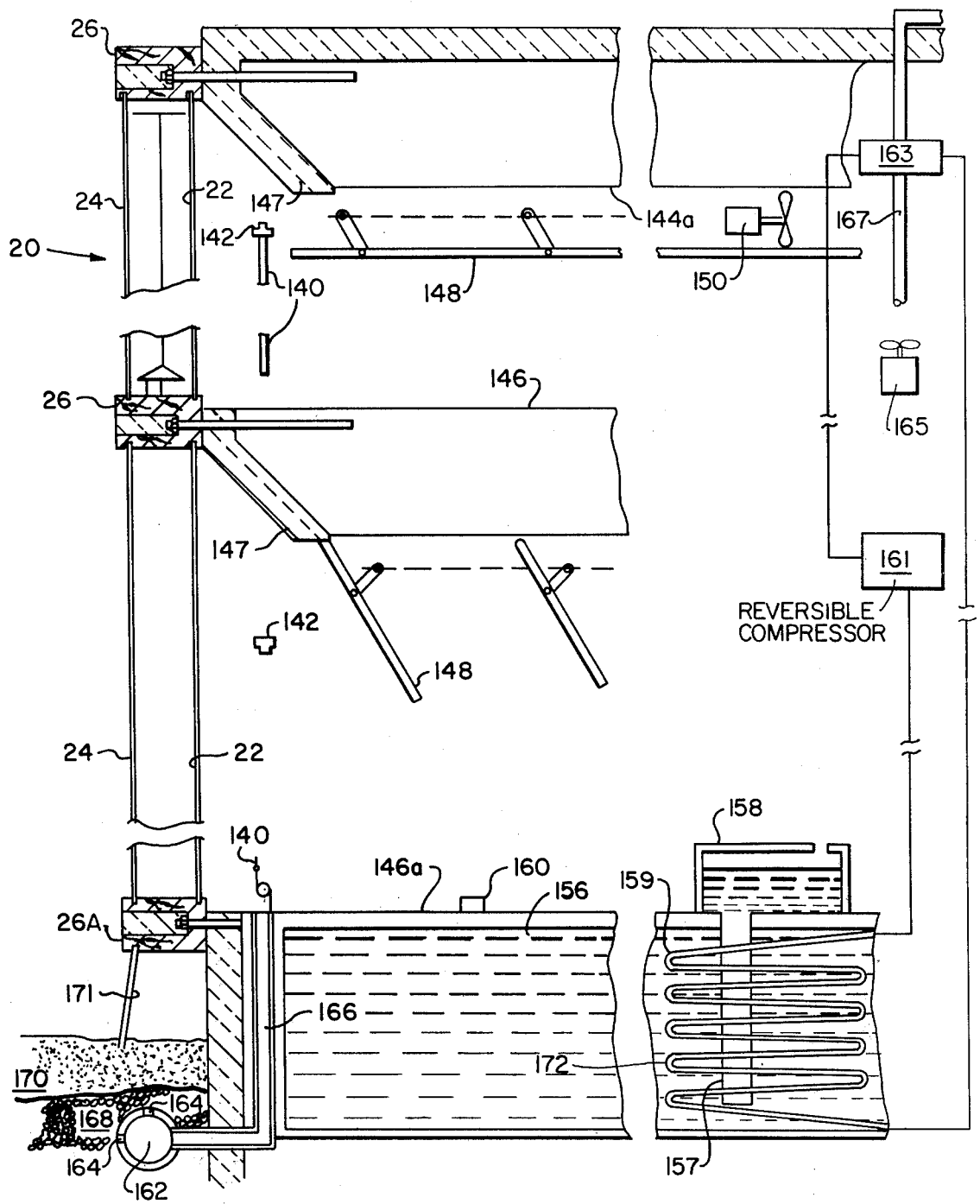
FIG. 1 shows a partial schematic and partial vertical cross-section through the wall of the building which is exposed to solar radiation which is constructed in accordance with the teachings of the present invention.

FIG. 1 shows the wall of building 20 which is exposed to solar radiation. Although the building 20 is shown as a multi-story structure, the invention may be also employed in single-story buildings. The wall of building 20 comprises windows having an inner glazed panel 22 and an outer glazed panel 24. Both panels are made of material which is transmissive to both light and near infrared heat energy, and opaque to middle and far infrared heat energy, such as glass or the like. The panels are preferably sealed in place at their top and bottom edges in the heat insulated sills 26 in a manner well known in the art. As shown further in FIG. 3, the side edges of the panels are secured to mullions 28 by battens 30. When supported to the mullions 28, the adjacent vertical edges of the panels will be slightly spaced from one another as well we from the column. This space is provided with an air filtering material 32, such as glass wool or the like. The density of the material 32 is dependent on the desired ventilation or air flow rate through the window, as will be more evident hereinafter. As shown in greater detail in FIG. 4, each batten 30 is provided with a vertically-directed groove 33 and a plurality of slots 34 which provide air passages from outside the window to the material 32. The vertically-directed groove 33 of each batten is disposed between the space provided between the adjacent vertical edges of adjacent glazed panels, while the slots are disposed adjacent the surface of the glazed panel and communicate at one end with the groove 33 and at the other end with a vertical side edge of the batten. The slots are oriented or inclined at an angle so that the end of each of the slots communicating with the groove 33 is higher than the end of the slots along the vertical edge of the batten. The batten thus provides an equal restraining force along the edges of the panel and are constructed to allow air, but prevent rain and snow from entering and leaving each window through the slots 34.

Figure 2:
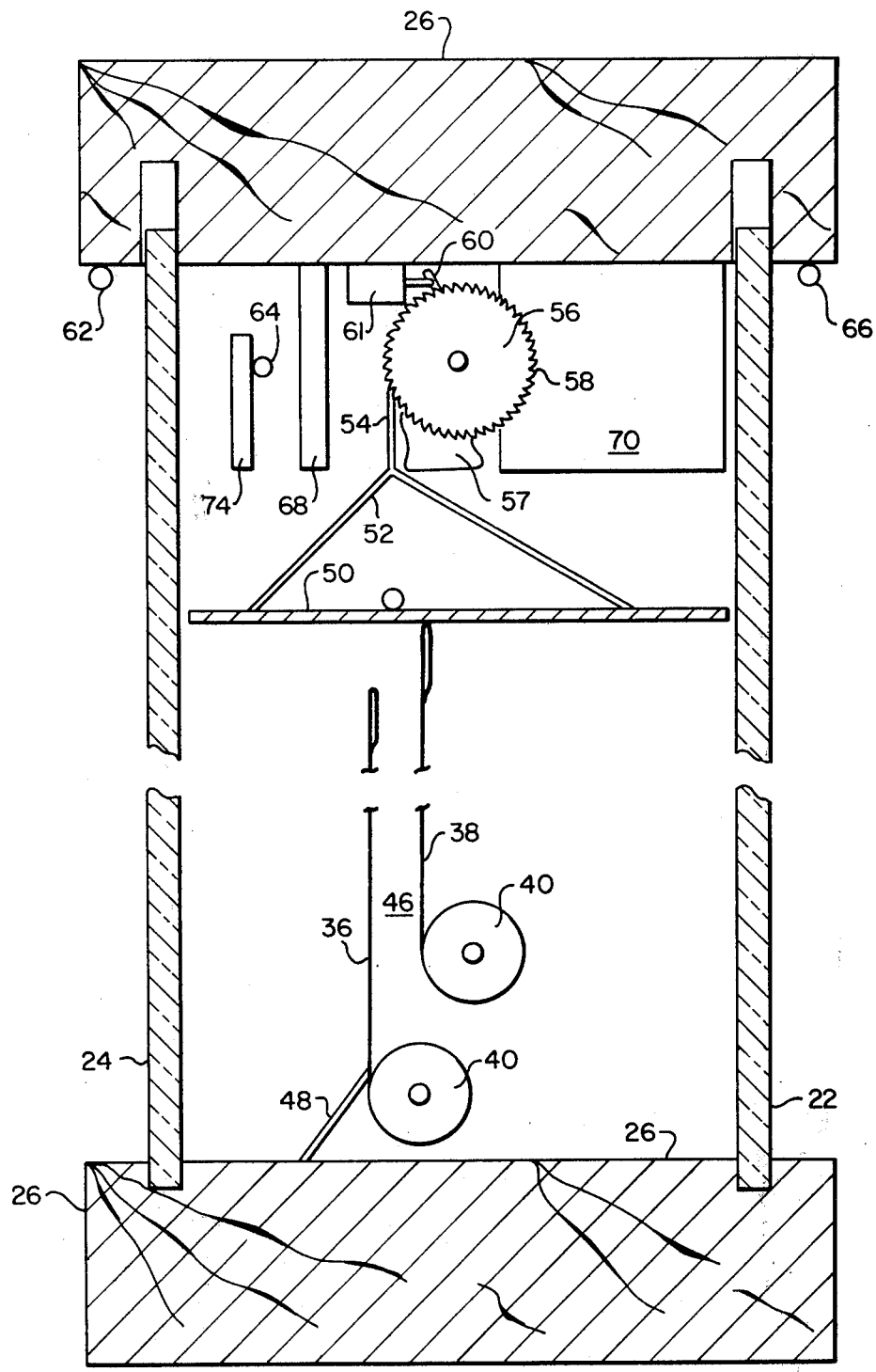
FIG. 2 shows a partial schematic and partial enlarged vertical cross-sectional view through an embodiment of a window constructed in accordance with the teachings of the present invention.

Referring again to FIGS. 2 and 3, each window also includes a pair of flexible foils 36 and 38 which mounted for vertical movement between the panels 22 and 24. The foils are preferably made of a material which is flexible and which reflects the visible and substantially all infrared portions of the electromagnetic spectrum. For example, the foils can be a thin layer of aluminum deposited on one side of a film of polyethylene terephthalate commercially available from E. I. duPont de Nemours & Co., Inc. of Wilmington, Del. under the trademark, Mylar ®. Each foil is mounted on a spring biased roller 40 so that when no counter restraining forces are applied to the end of the particular foil, the roller will rotate and the foil will wind onto the roller. The rollers are provided with suitable pivot pins 42 at each end so that they can be mounted directly to the mullions 28 or in the plates 41 provided on the mullions, to rotate about horizontal axes between adjacent columns. The roller 40 which is associated with the inside foil 38 is positioned inside of and above the roller associated with the outside foil 36. An air space 46 is thus provided between the foils 36 and 38. Means such as flap 48 may be utilized to substantially seal off any space which may be provided between the lower roller 40 and the lower sill 26. The vertical edges of each foil ride in slots 49 which are provided in the plate 41 and in the absence of plate 41, in the mullions 28. Slots 49 are very narrow, and, for example, are less than a tenth of a millimeter wide.

The top edges of each foil are attached to the flat plate 50 so that the top edge of the front foil 36 is spaced therefrom while the top edge of foil 38 is attached to plate 50 so that it substantially contacts the plate. Plate 50 is mounted in substantially a horizontal plane and is adapted to vertically slide between the panels 22 and 24. The plate is dimensioned so that its edges are very close to the panels 22 and 24 so as to substantially seal the area above the plate from the area below the plate. In order to affect the vertical sliding movement of the plate 50, the upper surface of the latter is attached to a frame or yoke 52, which in turn is secured to one end of cord 54. Cord 54 is attached to drum 56 which is rotatably driven by motor 57. One end of the drum 56 is provided with a ratchet gear 58. The latter cooperates with ratchet pin 60, the position of which is controlled by solenoid 61. Solenoid 61 is controlled by the output of logic 68 which is in turn controlled by the temperature sensing elements 62, 64 and 66. The latter are preferably temperature sensing diodes which are well known to those skilled in the art. Element 62 is positioned outside the building, preferably adjacent to outer panel 24 in order to sense the exterior temperature. Element 64 is positioned between the panels 22 and 24 in order to measure the temperature of a black body receiving insolation within the window. Finally, element 66 is positioned inside the building, preferably adjacent to inner panel 22. Sensing elements 62, 64 and 66 each provide an output signal which is a function of temperature of the air surrounding the sensing element. The output signals are applied to the logic card 68 which controls the motor 57 and solenoid 61 which in turn control the position of the plate 50 and thus whether the foils 36 and 38 are in an extended or retracted position. A DC battery 70 is provided to supply voltage for the system. Photovoltaic cells 74, which generate an electromagnetic force when radiant energy falls thereon, may be provided in order to charge the battery 70. Although logic 68 and battery 70 are shown and described as being positioned in the top of the window between panels 22 and 24, it will be appreciated that the logic and battery could be located elsewhere.

Figure 5:
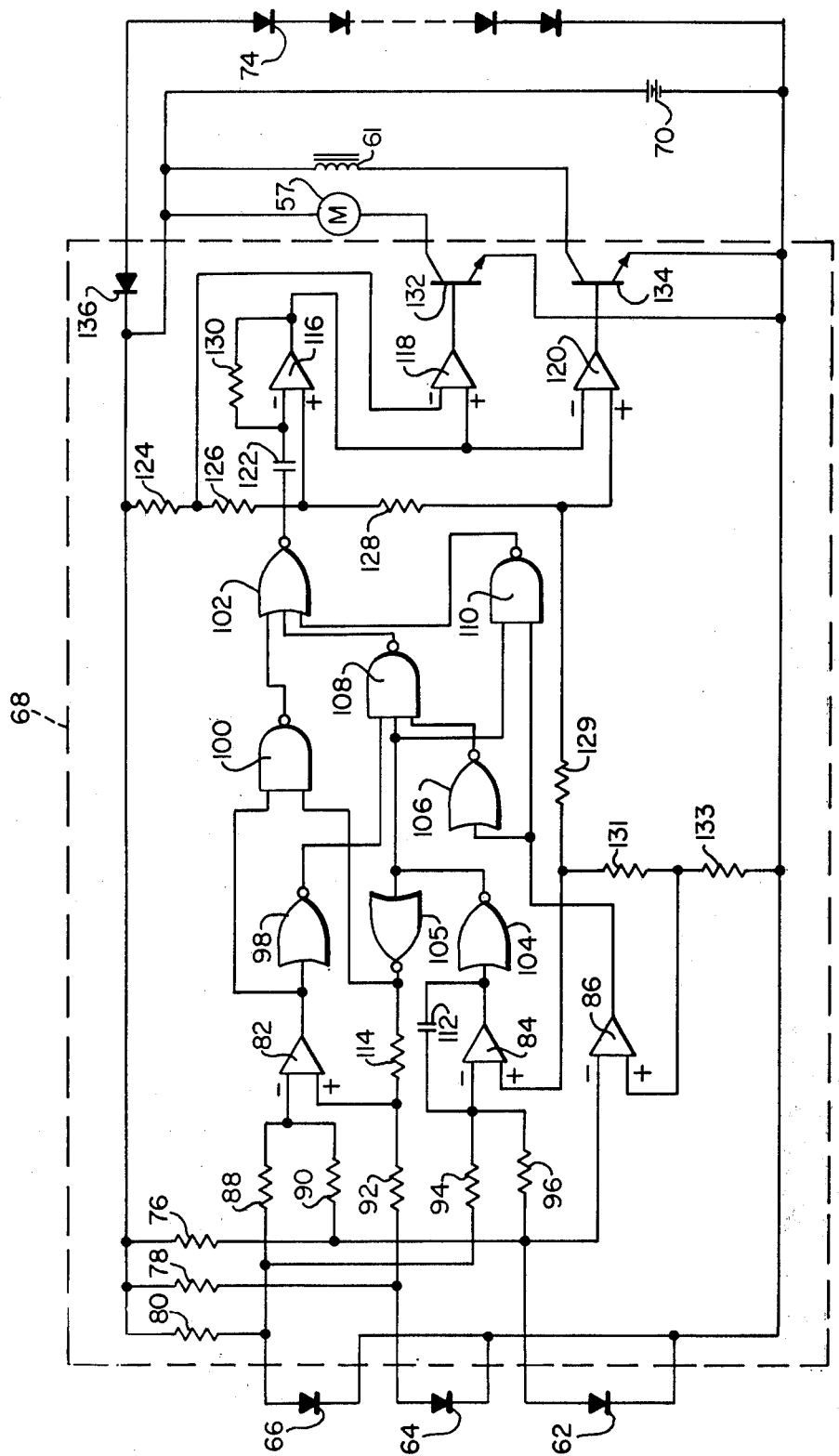
FIG. 5 shows in schematic, a servocontrol system which can be used with the window of FIG. 2.
Figure 6A:
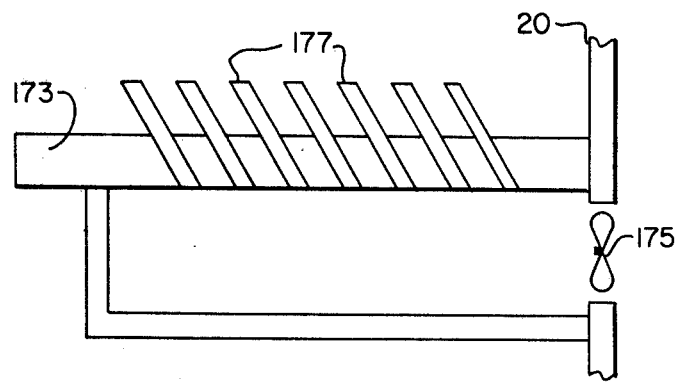
Figure 7:
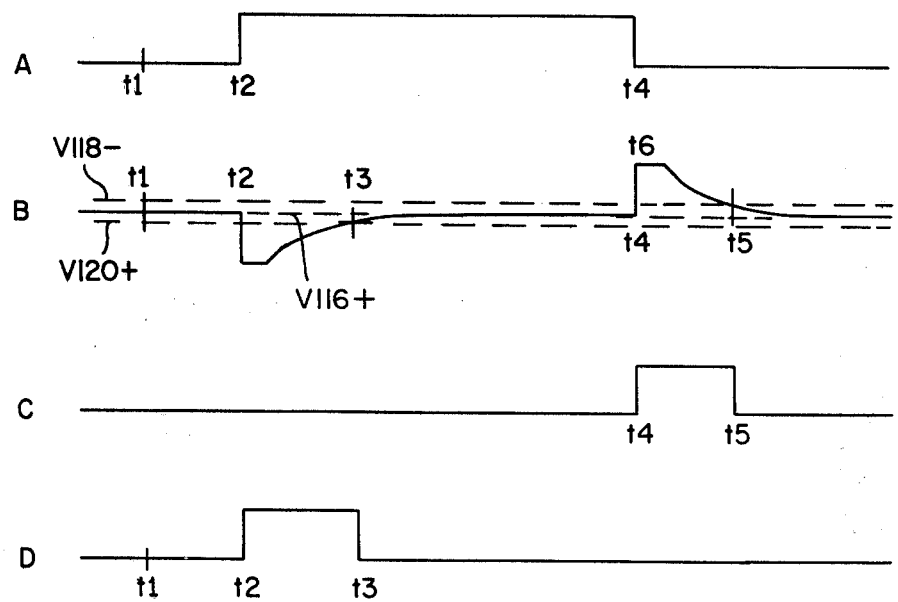

Referring to FIG. 5, wherein the servocontrol system for raising and lowering the foils 36 and 38 is shown in greater detail, sensing elements 62, 64 and 66 each have their anodes connected to the positive terminal of the battery 70 through the respective current resistors 76, 78 and 80; and their cathodes directly to the negative terminal of battery 70. It will be appreciated that the potential across each sensing element 62, 64 and 66 will thus vary inversely with the temperature sensed by it. The junction of the anodes of element 62 and resistor 76 is connected to the negative or inverting input terminal of the operational amplifier 82 through resistor 90, to the negative or inverting input of the operational amplifier 84 through resistor 96; and directly to the negative or inverting input of differential amplifier 86. The junction of the anode of sensing element 64 and resistor 78 is connected to the positive or direct input terminal of amplifier 82 through resistor 92. The junction of the anode of sensing element 66 and resistor 80 is connected through resistor 88 to the inverting input of amplifier 82 and the inverting input of amplifier 84 through resistor 94. Operational amplifiers 82, 84 and 86 are of a type well known in the art and provide a positive DC potential output when the potential at the positive or direct input terminal exceeds the potential at the negative or inverting input terminal. Conversely, the output of the amplifiers will drop to zero or a low logic output when the potential at inverting input terminal exceeds the potential at the direct input terminal.

The output of the amplifier 82 is connected to an input of each of the inverter 98 and NAND gate 100. The output of amplifier 84 is connected to an input of inverter 104 and is capacitively coupled to its own inverting input through the feedback capacitor 112. The output of amplifier 86 is directly connected to the input of inverter 106 and NAND gate 110. The output of inverter 98 is directly connected to an input of NAND gate 108; the output of inverter 104 is connected to the input of inverter 105 and NAND gates 108 and 110; and the output of inverter 105 is connected to resistor 114 which in turn is connected to the direct input terminal of the amplifier 82. The output of inverter 105 is also connected directly to an input of NAND gate 100. The output of the inverter 106 is connected to an input of NAND gate 108. The output of NAND gates 100, 108 and 110 are each connected to an input of NAND gate 102. As well known, each of the inverting gates 98, 104, 105 and 106 will provide a positive DC potential or high logic output so long as the input to the gate is low. If, however, the input receives a high signal, it will cause the output of the inverting gate to go low. The NAND gates 100, 102, 108 and 110 will each provide a high DC potential or logic null output if any of its inputs is of a low DC potential or logical null. If, however, all the inputs to the NAND gate are of a high DC potential or logical mark, the output will go to a low DC potential or logical mark, as well known in the art.

The output of the gate 102 is capacitively coupled to the negative or inverting input terminal of the operational amplifier 116 through the capacitor 122. The positive or direct input terminal of the operation amplifier 116 is connected to the positive terminal of the battery 70 through resistors 124 and 126 and to the negative terminal of the battery through resistors 128, 129, 131 and 133. The positive or direct input terminal of the operational amplifier 120 is connected to the junction of resistors 128 and 129. The junction of resistors 124 and 126 is connected to the negative or inverting input terminal of the operational amplifier 118. The junction of resistors 129 and 131 is connected to the positive input terminal of the amplifier 84. The junction of resistor 131 and the direct input terminal of amplifier 86 is connected to the negative terminal of battery 70 through the resistor 133. The output of amplifier 116 is tied to its negative or inverting input through feedback resistor 130, and directly connected to the positive input terminal of the operational amplifier 118 and the negative or inverting input of the operational amplifier 120. The output of the amplifier 118 is connected to the base of switching transistor 132. The output of the amplifier 120 is connected to the base of switching transistor 134.

The emitters of the transistors 132 and 134 are both directly connected to the negative terminal of battery 70 while their collectors are connected to the positive terminal of the battery through the motor 57 and the solenoid 61, respectively. As shown, battery 70 is charged by a plurality of photovoltaic cells 74 through the back current limiting diode 136. The latter has its cathode connected to the positive terminal of the battery 70, and its anode connected to the anode end of the plurality of photovoltaic cells 74.

Referring again to FIG. 1, as will be more evident hereinafter, during the winter months when the temperature is below some predetermined value, the foils are usually drawn or closed at night in order to conserve heat within the building. The foils are also drawn during warm summer days in order to reflect insolation.

The building may also include curtains 140 which may be provided if privacy is desired. Curtains 140 are supported in any suitable manner such as by curtain rod 142 so that they are spaced from the interior ceiling 144, panel 22, and floor 146. Curtains 140 are spaced from the inner surface of panel 22 so that air along the surface will be stagnant, moving generally in neither an upward or downward direction when winter insolation is striking the curtain. For example, for standard eight foot high curtains, the latter are spaced from the panel 22 about 0.1 meters. The rod 142 is spaced from the ceiling a distance depending on how much top lighting is desired. The spacing at the bottom of the curtain and the floor is made approximately half the spacing to the panel 22 in order to provide a path for circulating air. It is noted that the curtain, when used on a wall minimally exposed to solar energy, may extend all the way to the floor in order to help keep the heat within the building. Curtains 140 preferably should be made of material which is opaque and absorptive to the visible and near infrared portion of the spectrum, but transparent or reflecting to all other infrared, (i.e. heat in the building). For example, cellophane or other completely transmissive sheets containing small grains of silicon, germanium, thallium bromide-iodide or similar materials opaque in the visible and near infrared but transmissive and highly reflective to all other infrared are satisfactory. An example of the dimensions of a finished sheet would be a sheet having an overall thickness of between 25 and 100 micrometers and the grains from 5 to 25 micrometers in diameter. The floors 146 and ceiling 144 preferably are made of material which has a high heat capacity and heat conductivity, such as concrete or the like. Where the floor is covered, such a covering must be made of a thin and high thermally conductive material. The floors and ceilings are well insulated from the sills 26 in a manner well known in the art. The portion 147 of the ceiling adjacent the window is inclined at an angle, e.g. 45° and is preferably heat reflective. Insulating panels 148 are pivotally supported from each ceiling 144 so that in a closed position they form a duct therebetween, and in an open position, expose the ceiling to the interior rooms. The panels may be made of any heat insulating material such as foamed polystyrene or the like, and preferably are surfaced to be reflective to the full infrared spectrum. A fan 150 which may be thermostatically controlled is placed between the panels 148 and each ceiling 144 so as to draw air from interior portion of the building near the window through the building and circulate the air therein as will be described in greater detail hereinafter. This is particularly desirable when the building is provided with interior partitions.

A thermal delay and heat sink is incorporated into the building structure for storing a portion of the sun's energy so that this energy can be released at a later time into the building. The thermal delay and heat sink are in part provided by the intermediate concrete floor slabs. For example, if these floors are made 0.2 meters thick, the midafternoon heating of the bottom of the slabs produces a maximum heat release on the topside about dawn the next day when heat is usually most needed. In the preferred embodiment this heat sink is in part provided by the tank 156. The latter is filled with a heat absorbing fluid such as water or the like. It is preferred that the fluid completely fill the tank 156 since an air gap would act as a heat insulator and thus inhibit heat flow between the floor 146a and the fluid in the tank. An expansion tank 158 is preferably provided on the bottom floor which is in fluid contact with the tank 156 to hold the overflow from the latter. A pipe 157 is also provided wherein one end is placed near the bottom of the tank 156 and the other is placed in the bottom of the expansion tank 158. Since the coolest portion of the fluid is on the bottom of the tank 156, this portion will flow through pipe 157 into the expansion tank 158 when the fluid expands from heat input and fluid will flow back through pipe 157 into the tank 156 from tank 158 when fluid in tank 156 contracts. This structure utilizes the physical properties of water to maintain deaireation. However, a float or needle valve 160 may further be provided to let air out in order that the fluid will come into contact with the top of tank 156 when the latter is filled. If desired, the heat "storing" capabilities of the tank can be improved by making the bottom floor 146a transmissive to the visible and near infrared and the bottom of the tank radiant heat energy absorptive, in which case the pipe 157 and expansion tank may be eliminated and tank 156 need not be completely filled with fluid.

As described in my U.S. Pat. No. 3,952,947 the servo system of FIG. 5 is used to automatically raise and lower the foils 36 and 38 so as to control the amount of solar radiation used to heat the interior of the building. When the conditions are such that the foils are down, the energy will be transmitted through the glazed panels 22 and 24 whereupon they will strike each floor 146. Further, a blower 165 for exhausting air from the building through pipe 167 is provided. The visible and near infrared energy of the insolation absorbed will be mostly conducted to the floor 146, only a small portion of the energy being reradiated as energy in the far infrared region of the electromagnetic spectrum. Insolation energy will also be transferred from the floor 146 into the fluid in tank 156.

On days of exceptionally high insolation, the curtains 140 are drawn. During cold days when the curtain is drawn the warm air moving up both sides of curtain 140 will move along the underside of ceiling 144, where heat is transferred from the air to the ceiling. Fans 150, may be used to aid the transfer. The cool air returns along the floor and enters the space between the curtain 140 and panel 22. Since the curtain 140 and panel 22 are spaced to minimize motion of air adjacent the panel 22, the air passing between the panel and the curtain will be heated by heat transfer from the curtain with a minimum heat loss to the panel. Heat is stored in the ceiling during the day. During this time panels 148 may be pivoted to their closed position so as to substantially block heat transfer from the ceiling into the room. The heat stored in the ceiling during this time is transferred to the top of the slab 146 by the next morning. The remainder of the stored heat can be released directly into the room below either by natural heat convection or thermostatically by opening the panels 148. When the sun is not shining, the foils will be extended, thus blocking the transfer of heat through the window. As the interior begins to cool the heat absorbed in the floors will be convected and reradiated into the rooms, to provide heat.

In accordance with the present invention this system is improved upon by taking advantage of the natural resources available. Specifically, the system of the present invention includes the means for increasing the relative humidity of at least some of the air entering the building. Depending on the temperature outside the building, the entering air is either heated or cooled. As the air is circulated through the building it is either heated or cooled by the various means previously described including the tank 156 and exhausted through the ventilating pipe 167 by means of the blower 165. In accordance with the present invention means are also provided for recovering and storing heat from or releasing heat to the exhaust air depending upon the mode of operation.

In the preferred embodiment of the present invention, the foregoing is achieved by drawing air through the ground below the frost line before drawing it into the building. During cold days, when the temperature below the frost line is above the exterior temperature above ground this has the effect of heating the air, while during warm days, the effect is to cool the air. A further advantage is that on particularly dry days, the relative humidity tends to increase as it is drawn through the ground and into the building. More specifically, the preferred embodiment comprises a conduit in the form of a pipe 162 installed below the frost line around the entire perimeter and adjacent the footings of the building. At least one and preferably a plurality of apertures 164 are provided all around the pipe 162 so that air can be introduced into the pipe. Pipe 162 is preferably connected to the inside of the building by pipe 166. Pipe 162 is covered with peastone 168 which in turn is covered with sand 170. When it is desired to heat the incoming air, small glass panels 171 may be positioned on the underside of the lower sill 26A so as to trap insolation and add to the heat content of air entering pipe 162. Panels 171 are preferably tilted at about a 10° angle with respect to the vertical so as to minimize reflection of solar radiation therefrom. In this way, the relative humidity of exterior air entering the building can be raised and the temperature can be raised before it enters the interior of the building. The air is then circulated throughout the building and heated or cooled in accordance with the techniques previously described.

In order to recover heat from or release heat to the air exhausted from the building a system preferably comprising the tubing 159 is provided. Tubing 159, which contains a heat exchange fluid, such as the fluoronated hydrocarbon manufactured by E. I. du Pont de Nemours & Co., Inc. of Wilmington, Del., under the trademark FREON. Tubing 159 is preferably coiled at 172 in the heat absorbing fluid of tank 156 so as to provide an evaporator during warm weather and a condensor during cold weather. The tubing from one end of coil 172 is connected to a heat exchanger 163, the latter being positioned so that exhaust air drawn from the interior of the building by blower 165 will pass through the exchanger so that heat can either be released to or absorbed from the exhaust air depending upon the mode of operation. The tubing 159 also connects a reversible heat pump or compressor 161 which in turn is connected to the other end of coil 172. The reversible heat pump is designed to pump the heat exchange fluid from coil 172, through the compressor 161, to the heat exchanger 163, back to the coil when heat is released to the exhaust air, while in an opposite direction from the exchanger 163, through compressor 161, to the coil back to the exchanger 163 when heat is being removed or extracted from the exhaust air.

In operation, blower 165 is operated to exhaust stale air from the building through the pipe 167. In addition to drawing air through the windows as previously described, air is drawn through the ground and specifically through the sand and peastone through the apertures 164 into pipe 162. During warm days the air thus drawn will tend to cool as it is drawn below the frost line. During cold days, the opposite occurs, i.e. the air is warmed as it is drawn below the frost line. In the latter situation, the plates 171 can be positioned in place below sill 26a so as to trap insolation which in turn may be added to the heat content of the air as it is drawn into pipe 162. In either situation the air is drawn from pipe 162 through pipe 166 into the interior of the building. During warm days the pump 161 is operated so that some of the heat absorbed by the fluid in tank 156 can be released to the air as it passes through the heat exchanger 163 to the outside of the building. In this way the coil 172 functions as an evaporator so as to lower the temperature of the fluid in the tank 156 and tend to reduce the overall temperature of the air in the building. During cold days, however, when it is desirable to retain as much heat as possible, the pump 161 is reversed so that as the air is drawn through the exchanger 163 heat is extracted from the air by the heat exchange fluid and pumped in tubing 159, to the coil 172. The latter functions as a condensor so as to raise the temperature of the fluid in tank 156 so that it subsequently can be reradiated into the building.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A system for controlling the temperature, ventilation and humidity within an enclosed building comprising:

means disposed in the ground exterior to said building for changing the temperature and relative humidity of air passing therethrough, said means disposed in the ground including piping communicating with the interior of said building and having at least a portion disposed exterior of said building below the frost line, said portion of piping including at least one aperture for introducing exterior air from the ground into said piping;

means for drawing air from the exterior of said building to the interior of said building through said means disposed in the ground so as to change the relative humidity of the air drawn therethrough;

solar heating means for adding to the heat content of the air drawn through said means disposed in the ground so as to raise the temperature of the air; and means for recovering exhaust heat from air leaving said building comprising a first fluid for storing said heat, a tank for storing said first fluid, a second fluid, a compressor for compressing said second fluid, heat exchanger means for transferring heat from air leaving the interior of said enclosure to said second fluid when heat is to be stored and transferring from said second fluid to air leaving the interior of said enclosure when heat is to be released from said system, and conduit means including a coil disposed in said tank for transferring heat between said first and second fluids so as to provide a condensor when said heat is to be stored in said tank.

2. A system in accordance with claim 1 wherein said first fluid is water.

3. A syste in accordance with claim 1 wherein said second fluid is a heat exchange fluid.

4. A system in accordance with claim 1 further including means for drawing the air leaving the interior of said enclosure through said heat exchanger means.

5. A system in accordance with claim 1 wherein said means disposed in the ground includes peastone surrounding said piping and sand covering said peastone.

6. A system in accordance with claim 1 wherein said solar heating means for adding to the heat content includes at least one panel transmissive to insolation and capable of being supported at an angle with respect to an exterior wall of said building so as to trap insolation transmitted by said panel.

7. A system in accordance with claim 6 wherein said at least one panel is tilted at about 10° with respect to said exterior wall of said building.

8. In a system for controlling the temperature, ventilation and humidity within an enclosed building, comprising, in combination: conduit connected to and communicating with the interior of said building and having at least a portion disposed exterior of said building in the ground below the frost line, said portion of conduit including at least one aperture to allow air to pass from the ground into said conduit; means for drawing air from the exterior of said building through the ground through said aperture into said conduit and into the interior of said building so as to change the relative humidity of the air passing therethrough; the improvement comprising:

solar heating means for heating the air drawn through the ground, through said aperture into said conduit so as to change the temperature of the drawn air;

tank means for storing a first heat absorbing fluid;

a compressor for compressing a second fluid;

heat exchanger means for transferring heat from air leaving the interior of said building to said second fluid;

means for drawing air leaving the interior of said building through said heat exchanger means; and conduit means for transferring the second fluid among said tank, compressor and heat exchanger, said conduit means including a coil disposed in said tank, means for transferring heat between said first and second fluids so as to provide a condensor so that heat can be stored in said tank.

* * * * *

UNITED STATES PATENT AND TRADEMARK OFFICE
CERTIFICATE OF CORRECTION

PATENT NO. : 4,123,002
DATED : October 31, 1978
INVENTOR(S) : Norman B. Saunders It is certified that error appears in the above–identified patent and that said Letters Patent are hereby corrected as shown below:

Claim 3, Column 9, Line 37, change "syste" to -- system --.

Signed and Sealed this

Twentieth Day of March 1979

[SEAL]

Attest:

RUTH C. MASON
Attesting Officer

DONALD W. BANNER
Commissioner of Patents and Trademarks